No. 788,664. PATENTED MAY 2, 1905.
H. MERKEL.
PROCESS OF AND PRODUCT IN MONOLITH.
APPLICATION FILED FEB. 2, 1903.
2 SHEETS—SHEET 1.
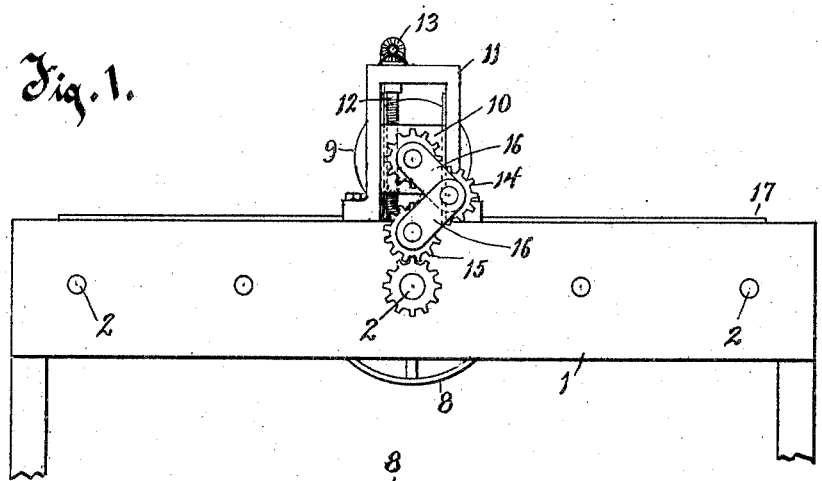
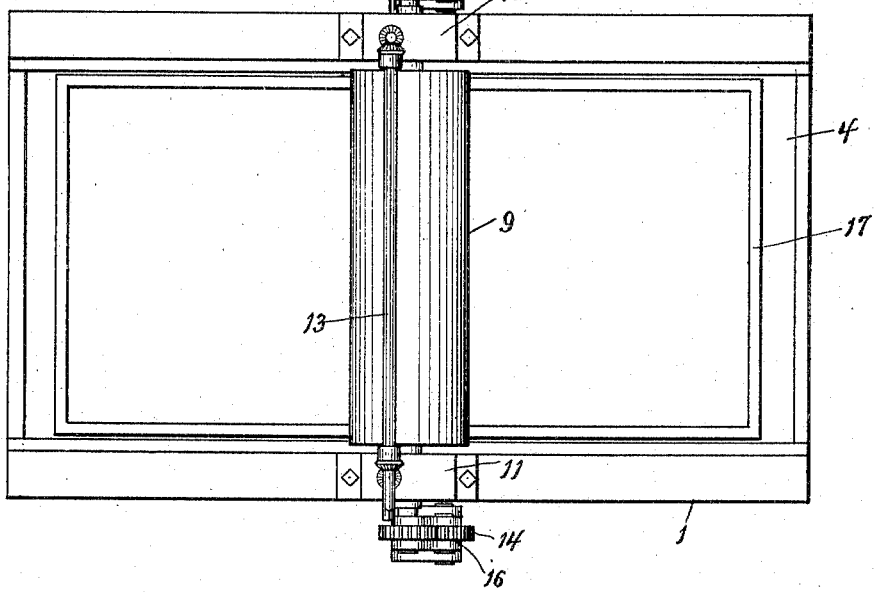

No. 788,664. PATENTED MAY 2, 1905.
H. MERKEL.
PROCESS OF AND PRODUCT IN MONOLITH.
APPLICATION FILED FEB. 2, 1903.

2 SHEETS—SHEET 2.

Witnesses:
C. H. Keeney,
Agnes Keeney

Inventor:
Harman Merkel
By Benedict Morsell Green
Attorneys

No. 788,664.

Patented May 2, 1905.

UNITED STATES PATENT OFFICE.

HARMAN MERKEL, OF MILWAUKEE, WISCONSIN.

PROCESS OF AND PRODUCT IN MONOLITH.

SPECIFICATION forming part of Letters Patent No. 788,664, dated May 2, 1905.

Application filed February 2, 1903. Serial No. 141,443.

*To all whom it may concern:*

Be it known that I, HARMAN MERKEL, residing at Milwaukee, in the county of Milwaukee and State of Wisconsin, have invented a new Process of and Product in Monolith, of which the following is a description, reference being had to the accompanying drawings, which are a part of this specification.

This invention relates to the production, both as to the process and the product, of articles in various forms—such as plane slabs of varying dimensions having the form of and adapted for the same use as wood boards, panels, moldings, &c.—of a material known to the trade as "monolith," composed of sawdust, cement, and carbonate of potash, or equivalent materials, with water and pressed together, the chief object of my invention being to provide a process of manufacture of such articles or others of a similar character, which process may be worked readily and rapidly and on a large scale comparatively inexpensively and with the result of producing articles that are even in texture, strong and durable in quality, and that have a smooth surface, neat in appearance and regularly or evenly variegated, and capable of being cut or planed and polished and that may be finished in their own colors or by covering them with varnish, paint, or other finishing material.

The accompanying drawings show mechanism by means of which portions of the novel process may be carried on advantageously and with the best results.

Figure 3:
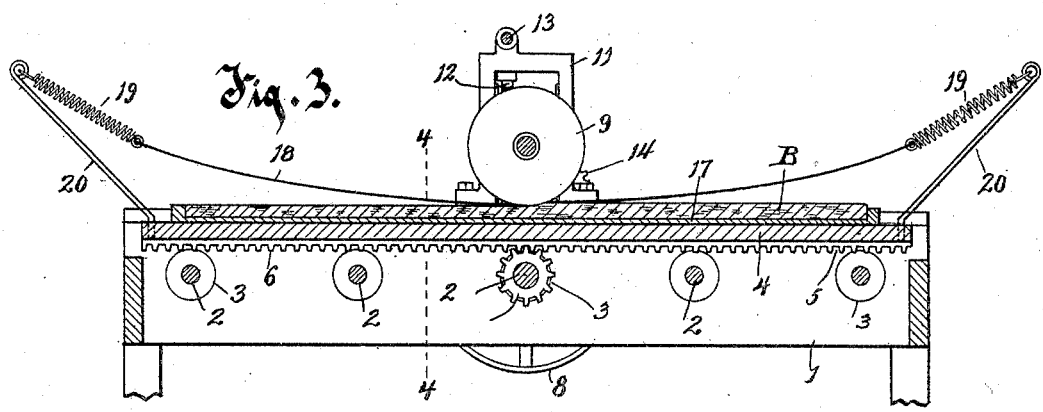
Figure 4:
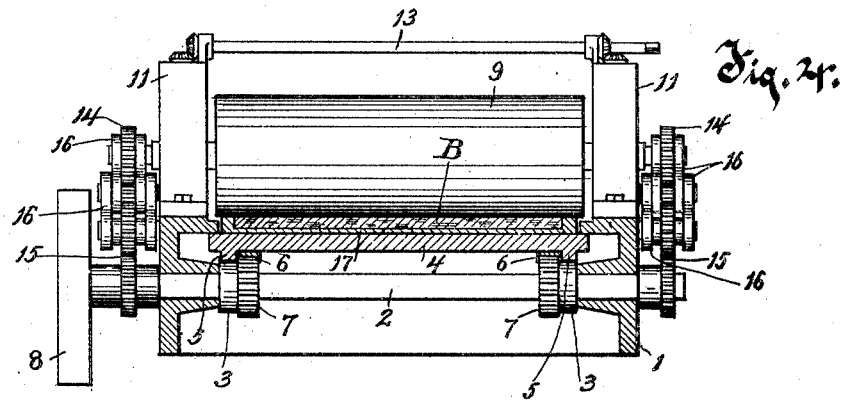
Figure 5:
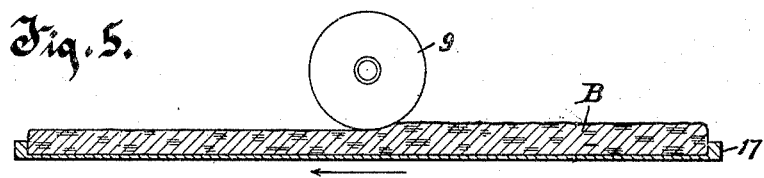
Figure 6:
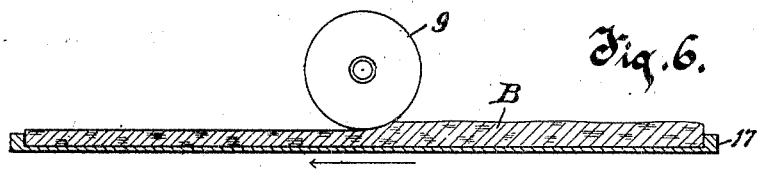
Figure 7:
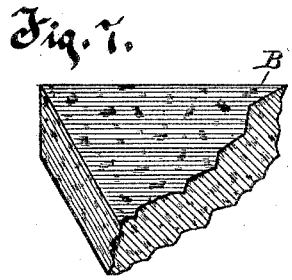

In the drawings, Figure 1 shows an elevation of mechanism by which portions of my process may conveniently be accomplished. Fig. 2 is a top plan view of the same mechanism. Fig. 3 is a longitudinal section of the same mechanism, showing material also in section in process of being reduced to even texture and being given a smooth surface and showing also a sheet of oil-cloth or rubber employed with the machine, this sheet not being shown in some of the other figures where it would properly appear, being omitted as unnecessary in those figures. Fig. 4 is a transverse section of the mechanism and material on line 4 4 of Fig. 3 looking toward the right. Fig. 5 is a longitudinal section of a tray employed with and, in effect, as a part of the mechanism, with monolith material in the tray and the presser-roll in outline, illustrating the operation of the process during an initial passage of the material under the presser-roll. Fig. 6 is a similar longitudinal section of the tray with monolith material therein being pressed additionally under the roll for subsequent results in the process of preparing the product. Fig. 7 represents a fragment of a board or article of monolith prepared by my novel process, the figure representing a fragment of the product or board substantially as thick as a piece of monolith clapboard.

A brief description of the mechanism shown in the drawings, by means of which a portion of my novel process is accomplished, is as follows:

In the drawings, 1 is a frame substantially in the form of a table or bench provided with a number of transversely-disposed axles 2 2, provided with carrying-wheels 3 3 thereon. An elongated carriage 4, provided with rails 5 5, is supported and travels, by means of these rails, on the wheels 3 3. The carriage 4 is also provided with racks 6 6, that gear with cog-wheels 7 7, fixed on one of the axles 2, and this axle is provided with a band-wheel 8 as a convenient means for rotating the axle and reciprocating the carriage forward and back on its support. A presser-roll 9 is mounted in blocks 10, movable vertically in ancillary frames 11, fixed on the frame 1, the roll being disposed above and transversely of the carriage. Vertical screws 12, rotatable in the ancillary frame 11, turning through the blocks 10, are adapted for raising and lowering the presser-roll. The screws 12 are rotated by a crank-shaft 13, which is geared to the screws. The presser-roll 9 is geared to the driven axle 2 by intermediate gears 14 15, the gears 14 being mounted on links 16 16 at their joints, whereby the gear connection between the presser-roll and the axle is maintained when the presser-roll is raised or lowered. A tray 17, adapted to rest and be carried by the carriage 4, is employed with this machine. These trays are usually made in considerable number, so that they can be used successively with the machine, and are of such form and have their walls of such height as adapt them for the forming and constructing of the product of my novel process in such form as is desired. In connection with this mechanism I also preferably employ a sheet of oil-cloth or rubber 18, which is advisably mounted on the carriage 4 most suitable by means of supporting-springs 19, attached to standards 20, mounted on the carriage.

In the carrying out of my novel process, by means of which the new product is obtained, I employ sawdust, either of pine or other soft wood or of hard wood, the kind and quality of the sawdust being selected with reference to the quality of the product desired, as well also with reference to its color or appearance. With the sawdust there is also mixed a mineral cement in the form of a light-colored powder which is found in the market and is known to the trade as "Plicaro cement-powder," which is cement material containing chiefly magnesium oxid with a small per cent. each of magnesium carbonate, calcium carbonate, and calcium sulfate having substantially the qualities of other mineral cements. The mixed sawdust and cement-powder are then reduced to a plastic mass by being mixed with a certain quantity of a solution made of a material consisting chiefly of crude magnesium chlorid with a trace of magnesium sulfate purchased in the market and known to the trade as "Plicaro cement liquid and water."

The ingredients of the monolith are prepared and mixed in a manner substantially as follows and in the following proportions: One hundred pounds of the Plicaro cement-powder and seventy pounds of sawdust are put into a barrel or some mixing apparatus, advisably some rotating receptacle having blades or stirrers therein, and the sawdust and cement are thoroughly mixed together. A quantity of the Plicaro cement liquid is put into a tank or other suitable receptacle, and water is added thereto in such amount as is necessary to reduce the solution to a specific gravity of 1.022, as near as may conveniently be. A quantity of the mixture of sawdust and cement is then put in a mixing-box with an equal quantity, pound for pound, of the solution, and the materials are thoroughly mixed by any convenient means, which may be such as are ordinarily employed in mixing mortar or cement, whereby the composition will be reduced to a thin plastic mass. A quantity of the thus-prepared plastic material B is then put in a tray 17, and the tray is placed on the carriage 4 and is run under the presser-roll 9, it being sufficient ordinarily to pass the tray and material under the roll at this time only once. The sheet of oil-cloth or rubber 18 is between the presser-roll and the material faced downward—that is, the oiled surface of the cloth or a correspondingly smooth surface of the rubber being toward the material. In Fig. 5 I have shown in a general way the method and effect of passing the tray under the roll to more clearly show the relations to each other of the material and the presser-roll and the effect on the material of passing it for the first time under the presser-roll. The effect and purpose of this first pressure is to compact the material together firmly and to give to the material a smooth surface of the form desired, which in most cases is a flat or board-like surface. Ordinarily this first compression of the material will reduce a mass of material that is one and one-half inches thick to about one and one-fourth inches thick and sometimes slightly more than this. The interposed sheet of oil-cloth or rubber 18 having a smooth and non-adherent surface next to the material does not stick to it, but prevents any of the material from being taken out of its place in the mass, as it is liable to be taken out by the presser-roll itself if permitted to contact directly with the material, as the material is quite apt in places to adhere to the roll and as the roll separates from the material to be torn out of its place in the mass, marring the surface thereof. When the tray, with the material therein, has been thus passed through the machine under the roll and has been suitably compressed and surfaced, the tray is removed from the carriage and is set aside on a level support and is left there for from one to three hours, depending on the humidity of the atmosphere and the temperature, during which time the material sets or hardens to a certain extent, at least so far as to reduce the material to a stiff but still slightly plastic mass. Thereupon the tray is again placed on the carriage and is again passed beneath the presser-roll and the interposed sheet of oil-cloth or rubber under great pressure, and thereby the material is again compacted and the surface is made smooth and given a finish. The tray is then set aside until the mass becomes thoroughly hard under the chemical action of its ingredients, when it is removed from the tray and is ready for use. In this manner strips or sheets of monolith material may be formed which can be used in the same manner and for the purpose of clap-boards or sheeting on buildings or for inside finishing, and, in fact, for almost every purpose that boards, either thick or thin, can be used for in buildings. Also the material may be planed and smoothed or polished, so as to be given a more firm and smooth surface than wood boards usually have. A fragment of such a board is shown in Fig. 7.

In passing the tray, with the material B therein, under the presser-roll 9 it is not the purpose to give the material such pressure as would squeeze the water or liquid out of it, which should not be done, because liquid in the material is required therein to accomplish the chemical action resulting in the change of the material from its plastic condition into the set or hardened condition in which it exists when the process is completed.

It will be understood that with a large number of trays to be filled successively with material and passed under the roller 9 active operation can be carried on very rapidly, and a large number of sheets or pieces of the material can be produced in a comparatively short time. Also it will be understood that these sheets or pieces of material will have a very smooth and hard surface, giving the sheet or piece of material a finished appearance. While this process is likely to be used mostly for the manufacture of sheets or pieces of material having a smooth flat surface, it is yet possible and easy to produce sheets or strips of material having a grooved or curved surface in cross-section by forming the presser-roll with suitable complementary annular ribs or depressions to produce corresponding raised or depressed surface features on the material and product.

What I claim as my invention is—

1. The process of manufacturing hard monolith with a smooth surface consisting in mixing sawdust and Plicaro cement-powder with a solution of Plicaro cement-liquid forming a plastic mass, spreading out and holding the mass in desired form, compressing it powerfully and concurrently smoothing it evenly without breaking up the surface, giving it time and conditions in which to set and harden partially, and then again compressing and smoothing it under great pressure.

2. In the process of manufacturing hard monolith with a smooth surface, the mixing of sawdust and Plicaro cement-powder with Plicaro cement liquid to be about 1.002 specific gravity forming a fluid or thin plastic mass, spreading out and holding a quantity of this compound mixture in a general form desired for the product, compressing and smoothing it, and giving the material time in the air in which to set and harden.

3. The process of manufacturing hard monolith with a smooth compact surface, consisting in mixing a compound of sawdust seven parts, and Plicaro cement-powder, being chiefly magnesium oxid with a small per cent. of magnesium carbonate, calcium carbonate and calcium sulfate ten parts, with a solution of Plicaro cement-liquid being chiefly magnesium chlorid, and water sufficient for and forming a thin plastic mass, spreading out the plastic mass, smoothing the surface and concurrently powerfully compressing the mass, allowing it time in suitable conditions to somewhat harden and partially set, and then again while in stiff but workable condition putting the mass under great pressure and concurrently smoothing and thereby compacting and polishing the surface.

4. A novel product, consisting of a composition of sawdust, Plicaro cement-powder, and a solution of Plicaro cement-liquid, said product being produced by mixing said ingredients in the proportions and in the manner set forth and compressing the mass under considerable pressure and then after time given to set and harden it, giving it a strong and finishing pressure as described.

In testimony whereof I affix my signature in presence of two witnesses.

HARMAN MERKEL.

Witnesses:
C. T. BENEDICT,
C. H. KEENEY.